(12) United States Patent
Komura et al.

(10) Patent No.: US 12,216,304 B2
(45) Date of Patent: *Feb. 4, 2025

(54) ILLUMINATION DEVICE INCLUDING LIGHT GUIDE WITH TILTED PORTION

(71) Applicant: Japan Display Inc., Tokyo (JP)

(72) Inventors: Shinichi Komura, Tokyo (JP); Koichi Okuda, Tokyo (JP); Ken Onoda, Tokyo (JP); Hiroaki Kijima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,521

(22) Filed: Jun. 21, 2023

(65) Prior Publication Data

US 2023/0333307 A1 Oct. 19, 2023

Related U.S. Application Data

(63) Continuation of application No. 17/657,400, filed on Mar. 31, 2022, now Pat. No. 11,726,253.

(30) Foreign Application Priority Data

Mar. 31, 2021 (JP) .................................. 2021-060862

(51) Int. Cl.
*F21V 8/00* (2006.01)
(52) U.S. Cl.
CPC ......... *G02B 6/0018* (2013.01); *G02B 6/0028* (2013.01); *G02B 6/0031* (2013.01);
(Continued)

(58) Field of Classification Search
CPC .... G02B 6/0018; G02B 6/002; G02B 6/0068; G02B 6/0091
See application file for complete search history.

(56) References Cited

U.S. PATENT DOCUMENTS 7,625,111 B2 12/2009 Lee et al.
2007/0201234 A1 8/2007 Ottermann
(Continued)

FOREIGN PATENT DOCUMENTS

CN 209946440 U 1/2020
JP 2001067919 A 3/2001
(Continued)

OTHER PUBLICATIONS

English Translation from the Global Dossier of corresponding Chinese application. (Year: 2023).*

(Continued)

*Primary Examiner* — Keith G. Delahoussaye
(74) *Attorney, Agent, or Firm* — Maier & Maier, PLLC (57) ABSTRACT

According to an embodiment, an illumination device includes a light guide having a first plane, a second plane opposed to the first plane and substantially parallel to the first plane, and a tilted plane opposed to the first plane and tilted to the first plane, the tilted plane and the second plane being arranged in a first direction, and a light emitting device including a first light emitting part, a second light emitting part, and a third light emitting part which are located directly below the tilted plane, arranged in the first direction, and configured to emit light having wavelengths different from each other.

4 Claims, 8 Drawing Sheets

(52) U.S. Cl.
CPC ......... *G02B 6/0036* (2013.01); *G02B 6/0045* (2013.01); *G02B 6/0046* (2013.01); *G02B 6/0055* (2013.01); *G02B 6/0068* (2013.01); *G02B 6/0091* (2013.01); *G02B 6/0048* (2013.01)

(56) References Cited

U.S. PATENT DOCUMENTS

| | | | |
|---|---|---|---|
| 2008/0260328 A1 | 10/2008 | Epstein | |
| 2009/0003015 A1 | 1/2009 | Lee et al. | |
| 2009/0262283 A1* | 10/2009 | Olson | G02B 6/002 |
| | | | 349/65 |
| 2010/0289986 A1* | 11/2010 | Shikii | G02F 1/133621 |
| | | | 349/65 |
| 2014/0153281 A1 | 6/2014 | Zhao et al. | |
| 2018/0074247 A1 | 3/2018 | Asakawa et al. | |
| 2019/0371971 A1 | 12/2019 | Kozuru et al. | |
| 2021/0132285 A1 | 5/2021 | Takase | |

FOREIGN PATENT DOCUMENTS

| | | |
|---|---|---|
| JP | 2002270023 A | 9/2002 |
| JP | 200431180 A | 1/2004 |
| JP | 200455430 A | 2/2004 |
| JP | 2011138698 A | 7/2011 |
| JP | 201845778 A | 3/2018 |
| JP | 2019212752 A | 12/2019 |
| WO | 2010050489 A1 | 5/2010 |

OTHER PUBLICATIONS

T.-C. Teng and C.-H. Sun, "Integrating Backlight With Color-Filter-Free Panel for Enhancing Performance of LCD," in IEEE Photonics Journal, vol. 12, No. 1, pp. 1-16, Feb. 2020, Art No. 7000116, doi: 10.1109/J PHOT.2019.2957385. (Year: 2020).
Office Action issued on Jul. 29, 2023, in corresponding Chinese Application No. 202210314257.9, 9 pages.
Office Action issued on Mar. 26, 2024, in corresponding Japanese Application No. 2021-060862, 10 pages.
Office Action issued on Aug. 20, 2024, in corresponding Japanese Application No. 2021-060862, 10 pages.
Office Action issued on Dec. 3, 2024, in corresponding Japanese Application No. 2021-060862, 10 pages.

\* cited by examiner

ILLUMINATION DEVICE INCLUDING LIGHT GUIDE WITH TILTED PORTION

CROSS-REFERENCE TO RELATED APPLICATIONS

This application is a continuation of U.S. application Ser. No. 17/657,400, filed on Mar. 31, 2022, and based upon and claims the benefit of priority from Japanese Patent Application No. 2021-060862, filed Mar. 31, 2021, the entire contents of each of which are incorporated herein by reference.

FIELD

Embodiments described herein relate generally to an illumination device.

BACKGROUND

For example, a light emitting device comprising a package of a first semiconductor laser device emitting red light, a second semiconductor laser device emitting green light, and a third semiconductor laser device emitting blue light has been proposed. Such a light-emitting device can be applied to, for example, an illumination device (backlight device) for illuminating a liquid crystal panel.

In recent years, a demand for thinner liquid crystal display devices has further increased, thinning the illumination devices has been requested.

DETAILED DESCRIPTION

According to an embodiment, an illumination device includes: a light guide having a first plane, a second plane opposed to the first plane and substantially parallel to the first plane, and a tilted plane opposed to the first plane and tilted to the first plane, the tilted plane and the second plane being arranged in a first direction; and a light emitting device including a first light emitting part, a second light emitting part, and a third light emitting part which are located directly below the tilted plane, arranged in the first direction, and configured to emit light having wavelengths different from each other.

According to another embodiment, an illumination device includes: a light guide having a first plane, a second plane opposed to the first plane and substantially parallel to the first plane, a first tilted plane opposed to the first plane and tilted to the first plane, a second tilted plane located between the first tilted plane and the second plane, and a third tilted plane located between the second tilted plane and the second plane, the first tilted plane, the second tilted plane, and the third tilted plane being arranged in this order in a first direction; and a light emitting device including a first light emitting part located directly below the first tilted plane, a second light emitting part located directly below the second tilted plane, and a third light emitting part located directly below the third tilted plane, the first light emitting part, the second light emitting part, and the third light emitting part being configured to emit light having wavelengths different from each other.

According to the embodiments, an illumination device capable of being downsized can be provided.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as an X-direction or a first direction, a direction along the Y-axis is referred to as a Y-direction or a second direction, and a direction along the Z-axis is referred to as a Z-direction or a third direction. A plane defined by the X-axis and the Y-axis is referred to as an X-Y plane, and a plane defined by the X-axis and Z-axis is referred to as an X-Z plane. Viewing the X-Y plane is referred to as planar view. The first direction X and the second direction Y correspond to directions parallel to the main surface of the light guide included in the illumination device, and the third direction Z corresponds to the thickness direction of the light guide.

Figure 1:
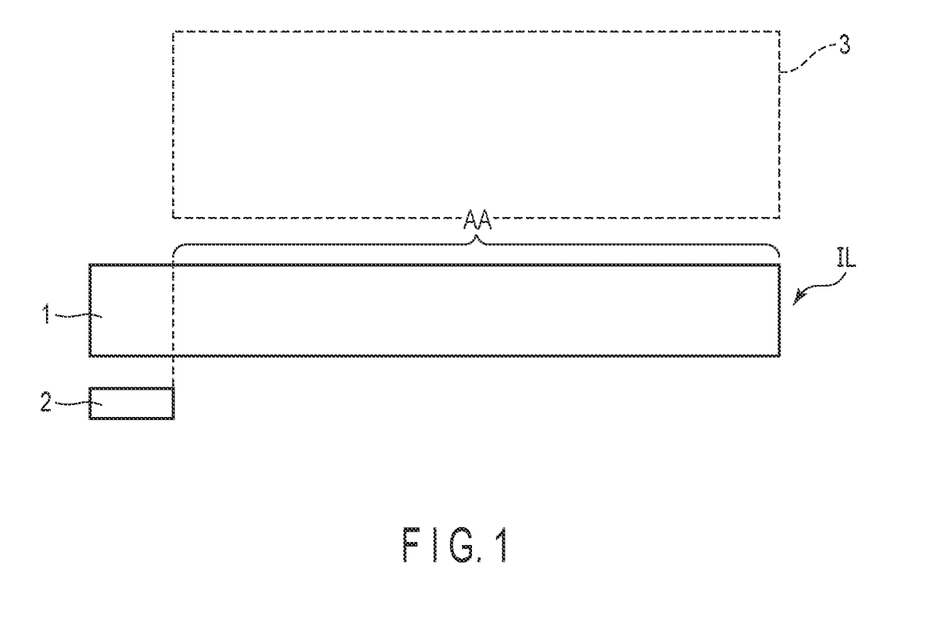
FIG. 1 is a view illustrating an illumination device IL according to embodiments.

FIG. 1 is a view illustrating an example of an illumination device IL according to the embodiments.

The illumination device IL comprises a light guide 1 and a light emitting device 2. The light guide 1 and the light emitting device 2 shown in FIG. 1 do not reflect their shapes, and the details of the light guide 1 and the light emitting device 2 will be described later. The light emitting device 2 is disposed to overlap one end side of the light guide 1. An effective area AA of the light guide 1 is an area where light propagating inside the light guide 1 is emitted, and overlaps an illumination target 3. The illumination target 3 represented by a dotted line in the figure is, for example, a liquid crystal panel.

When the liquid crystal panel is a transmissive panel that displays images by selectively transmitting illumination light, the illumination device IL functions as a backlight device. In addition, when the liquid crystal panel is a reflective panel that displays images by selectively reflecting illumination light, the illumination device IL functions as a front light device.

The illumination target 3 is not limited to the liquid crystal panel, but may also be a display panel comprising an electrophoretic element, a display panel to which microelectromechanical systems (MEMS) are applied, or the like.

A display device can be configured by combining the illumination device IL of the embodiments with the display panel which is the illumination target 3.

Figure 2:
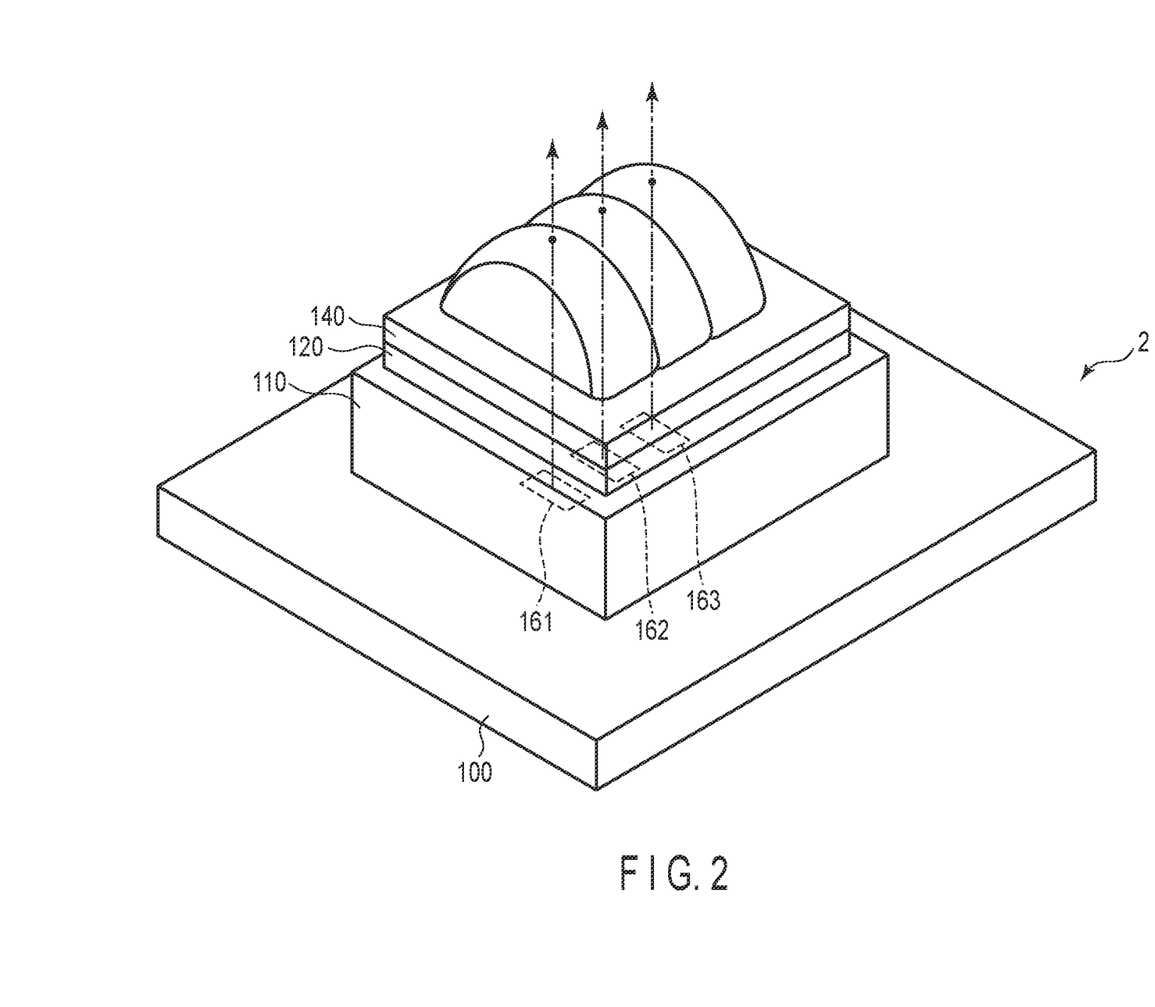
FIG. 2 is a view showing an example of a light emitting device 2 shown in FIG. 1.

FIG. 2 is a view showing an example of a light emitting device 2 shown in FIG. 1.

The light emitting device 2 comprises a package that emits light and a mounting substrate 100 on which the package is mounted. The only package may be recognized as the light emitting device 2.

The package comprises a base portion 110, a lid portion 120, a lens member 140, a first light emitting part 161, a second light emitting part 162, and a third light emitting part 163. The first light emitting part 161, the second light emitting part 162, and the third light emitting part 163 are accommodated in a closed space formed by joining the base portion 110 and the lid portion 120.

The first light emitting part 161, the second light emitting part 162, and the third light emitting part 163 are configured to emit light of wavelengths different from each other. For example, the first light emitting part 161 comprises a first semiconductor laser device emitting red light, the second light emitting part 162 comprises a second semiconductor laser device emitting green light, and the third light emitting part 163 comprises a third semiconductor laser device emitting blue light.

For example, each of the first light emitting part 161, the second light emitting part 162, and the third light emitting part 163 is configured to reflect light emitted from each semiconductor laser device toward the lens member 140 by a light reflecting member, but is not limited to this. For example, the light reflecting member may be omitted and each of the first light emitting part 161, the second light emitting part 162, and the third light emitting part 163, may be configured such that each semiconductor laser device directly emits light toward the lens member 140.

The lens member 140 is bonded to the lid portion 120. For example, the lens member 140 has a shape in which a plurality of lens parts are connected. In addition, the lens member is configured such that one lens part corresponds to one light emitting part, and each lens part allows a major part of the light emitted from each light emitting part to be transmitted therethrough.

Figure 3:
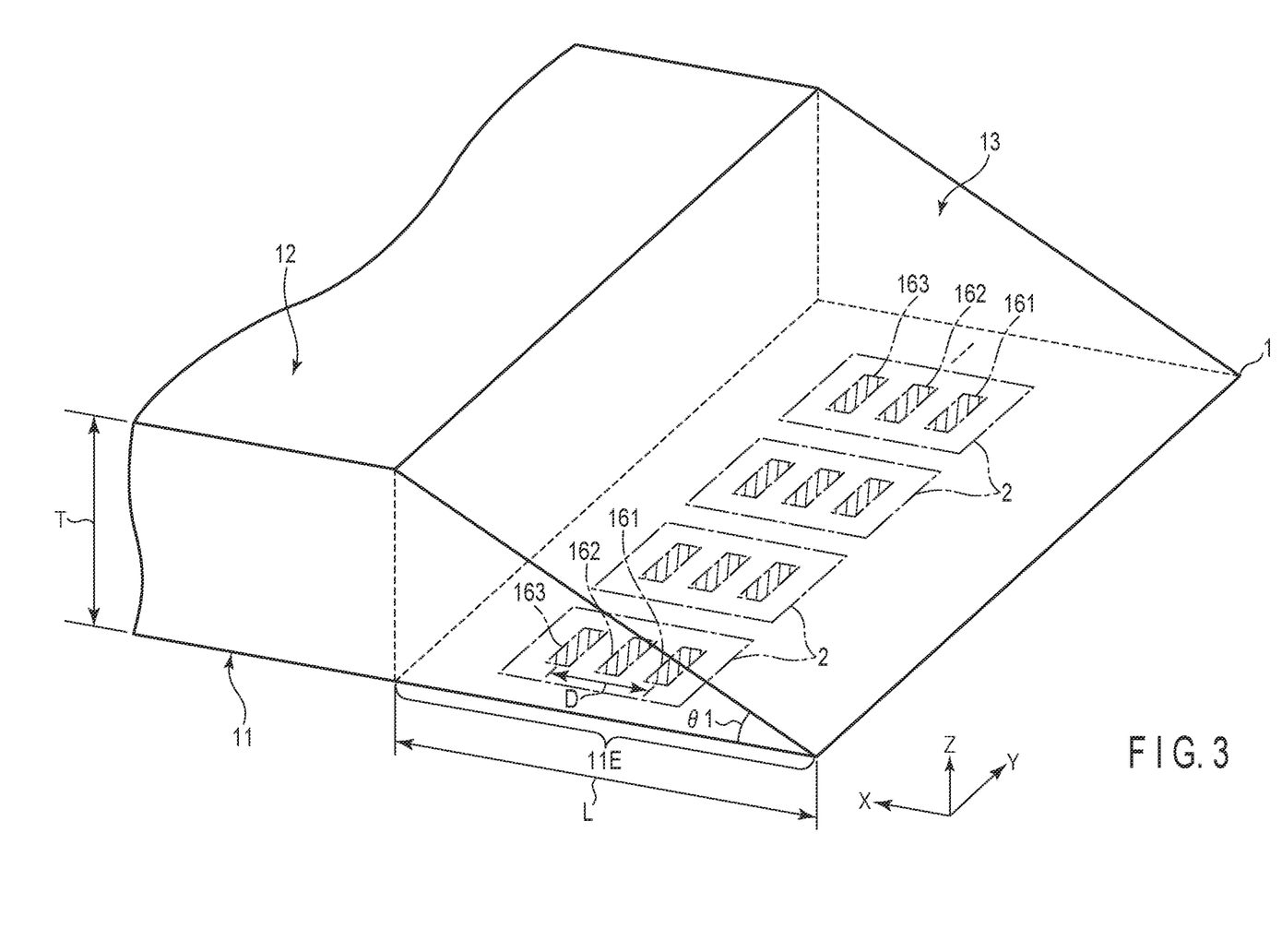
FIG. 3 is a view showing an example of a light guide 1 shown in FIG. 1.

FIG. 3 is a view showing an example of a light guide 1 shown in FIG. 1.

The light guide 1 has a first plane 11, a second plane 12, and a tilted plane 13. The first plane 11 is a plane parallel to the X-Y plane. The second plane 12 and the tilted plane 13 are opposed to the first plane 11 in the third direction Z. The second plane 12 is a plane substantially parallel to the first plane 11 or the X-Y plane. The tilted plane 13 is a plane titled to the first plane 11 or the X-Y plane. The tilt angle of the tilted plane 13, i.e., the angle θ1 formed between the first plane 11 and the tilted plane 13 is an acute angle. The tilted plane 13 and the second plane 12 are arranged in the first direction X. An area of the first plane 11, which is located directly below the tilted plane 13 (the area overlapping the tilted plane 13 in the third direction Z), corresponds to an incident light area 11E.

The light guide 1 may be formed of glass or resin.

The light emitting devices 2 are simply illustrated two-dimensionally as represented by one-dot chain lines. Illustration of the lens member and the like is omitted. The plurality of light emitting devices 2 are located directly below the tilted plane 13 or the incident light area 11E and are arranged in the second direction Y. In each of the light emitting devices 2, the first light emitting part 161, the second light emitting part 162, and the third light emitting part 163 are arranged in this order in the first direction X. Each of the first light emitting part 161, the second light emitting part 162, and the third light emitting part 163 is configured to emit light toward the incident light area 11E.

A length L of the tilted plane 13 along the first direction X or a length L of the incident light area 11E along the first direction X is larger than the thickness T of the light guide 1 along the third direction Z (L>T).

In addition, a distance D along the first direction X from the first light emitting part 161 to the third light emitting part 163 is larger than the thickness T of the light guide 1 (D>T). The thickness T is 1.5 mm or less, for example, 1.0 mm.

Figure 4:
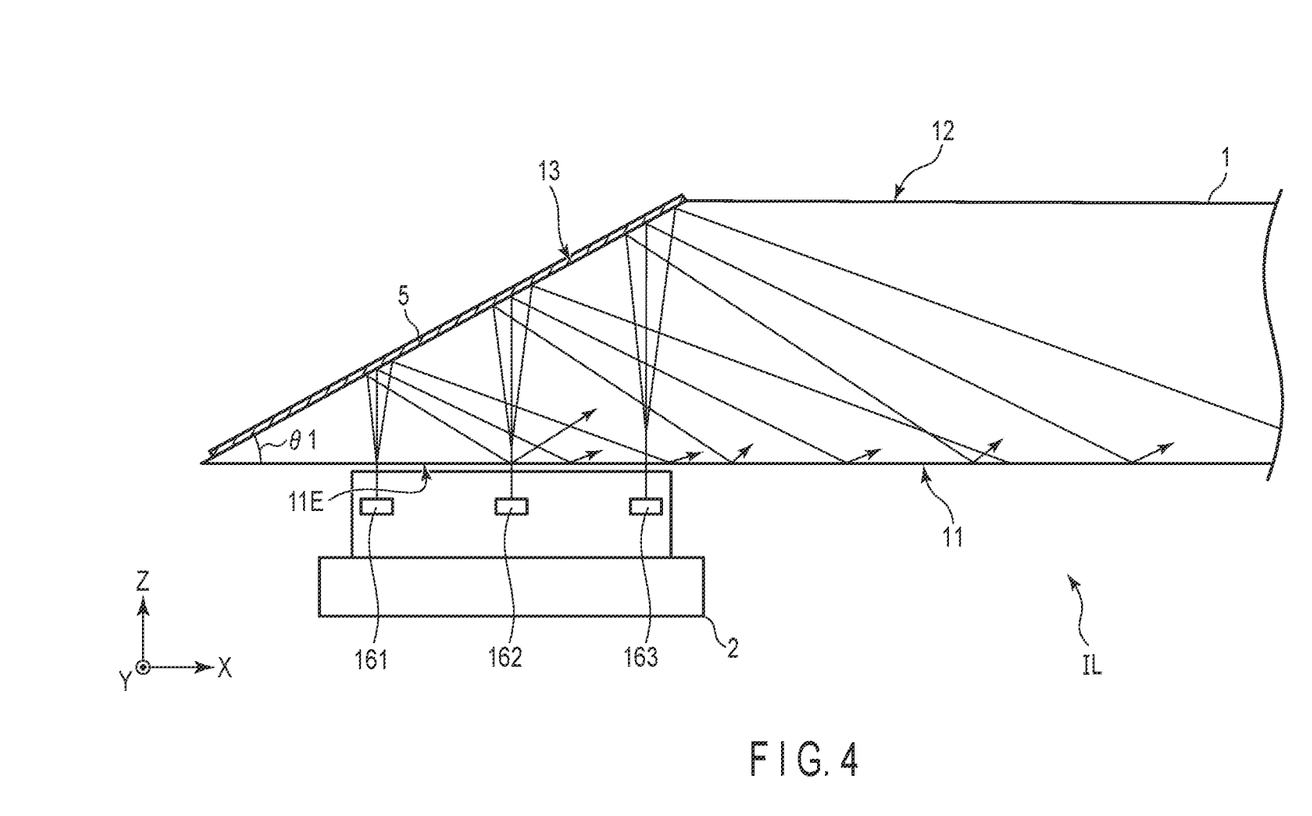
FIG. 4 is a cross-sectional view showing an example of the illumination device IL.

FIG. 4 is a cross-sectional view showing an example of the illumination device IL. The only main parts of the light emitting device 2 are illustrated, and illustration of the lens member and the like is omitted.

The illumination device IL further comprises a reflective layer 5 disposed on the tilted plane 13. The reflective layer 5 is located directly above the light emitting device 2. In other words, the first light emitting part 161, the second light emitting part 162, and the third light emitting part 163 are opposed to the reflective layer 5 in the third direction Z. In the example illustrated in the figure, the reflective layer 5 is disposed to cover substantially the entire surface of the tilted plane 13. The reflective layer 5 may be disposed so as to be located only directly above the light emitting device 2 or may be disposed so as to be located only directly above each of the first light emitting part 161, the second light emitting part 162, and the third light emitting part 163.

Each of the red light emitted from the first light emitting part 161, the green light emitted from the second light emitting part 162, and the blue light emitted from the third light emitting part 163 is made incident from the incident light area 11E and is reflected on the reflective layer 5 or an interface between the tilted plane 13 and the reflective layer 5. The reflected light of each color is totally reflected on the first plane 11 to propagate inside the light guide 1.

The tilt angle θ1 of the tilted plane 13 is set to satisfy the condition that the reflected light on the reflective layer 5 is totally reflected on the first plane 11, i.e., the angle of incidence to the first plane 11 is larger than or equal to a critical angle.

In addition, to the main light that is almost parallel to the normal of the incident light area 11E, the light of each color may contain divergent components that are slightly spread out with respect to the normal. The tilt angle θ1 is desirably set such that not only the main light but also the divergent component satisfy the total reflection condition.

Figure 5:
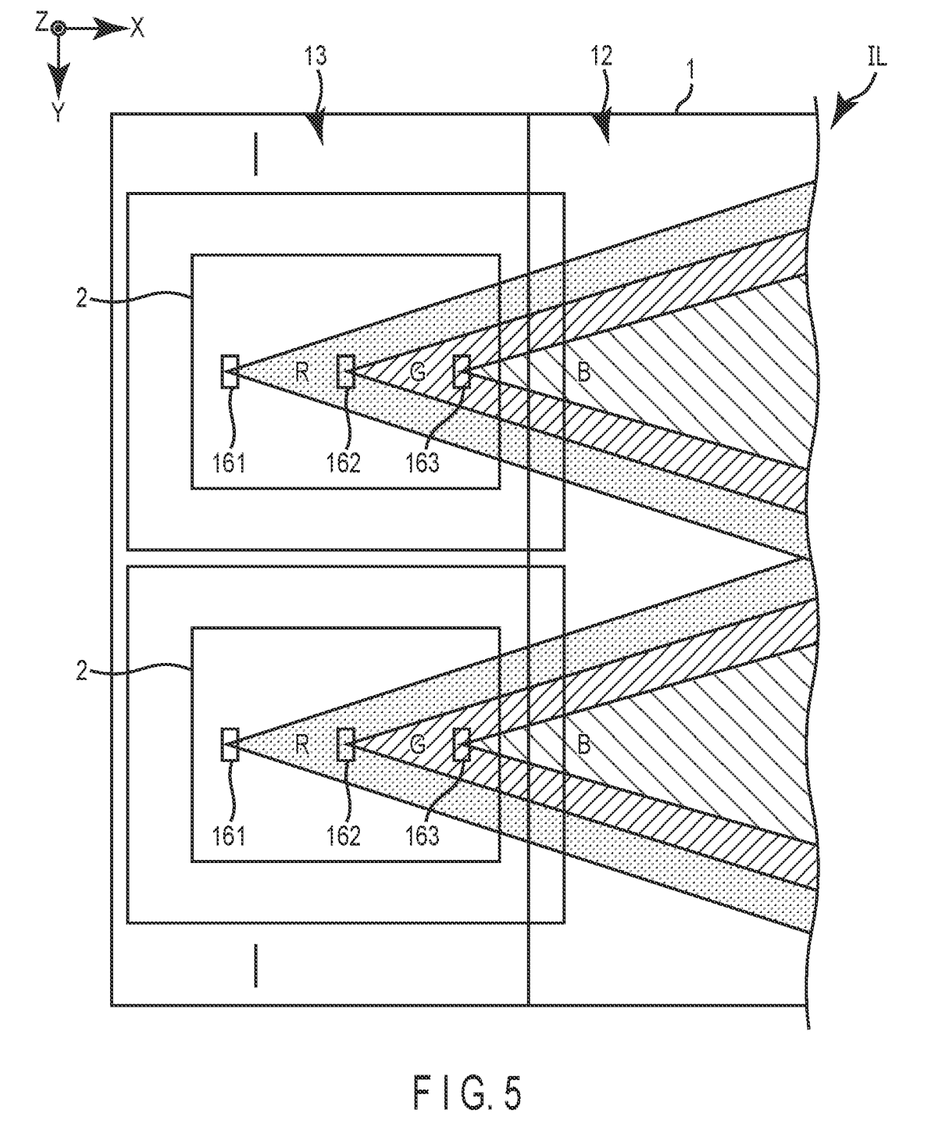
FIG. 5 is a plan view showing an example of an illumination device IL.

FIG. 5 is a plan view showing an example of an illumination device IL.

In the planar view, in the area overlapping the tilted plane 13, red light (R) emitted from the first light emitting part 161, green light (G) emitted from the second light emitting part 162, and blue light (B) emitted from the third light emitting part 163 mix together while propagating along the first direction X. In addition, in the area overlapping the second plane 12, the light emitted from each of the light emitting devices 2 adjacent in the second direction Y spread in the second direction Y while propagating along the first direction X and mix together.

FIG. 5 schematically shows a state in which each of the red light, the green light, and the blue light spreads, but the degree of spreading or directivity in the X-Y plane is not necessarily the same for the red light, the green light, and the blue light. When directivities of the red light, the green light, and the blue light are different from each other, the light having a higher directivity (difficult to spread) is desirably emitted from a position far from the second plane 12, and the light having a lower directivity (easy to spread) is desirably emitted from a position close to the second plane 12. In other words, in the example shown in FIG. 5, a combination of the light emitted from the first light emitting part 161, which has a higher directivity, and the light emitted from the third light emitting part 163, which has a lower directivity, can be applied.

According to the illumination device IL, the distance along the first direction X required for the light of different wavelengths to mix with each other can be shortened as compared with the edge light system in which the first light emitting part 161, the second light emitting part 162, and the third light emitting part 163, which are arranged in the second direction Y, are opposed to the side surfaces of the light guide 1.

In addition, according to the above-described illumination device IL, the thickness of the light guide 1 can be made smaller regardless of the distance from the first light emitting part 161 to the third light emitting part 163, as compared with the other edge light system in which the first light emitting part 161, the second light emitting part 162, and the third light emitting part 163 arranged in the third direction Z are opposed to the side surfaces of the light guide 1.

Downsizing the illumination device IL can be thereby implemented.

Figure 6:
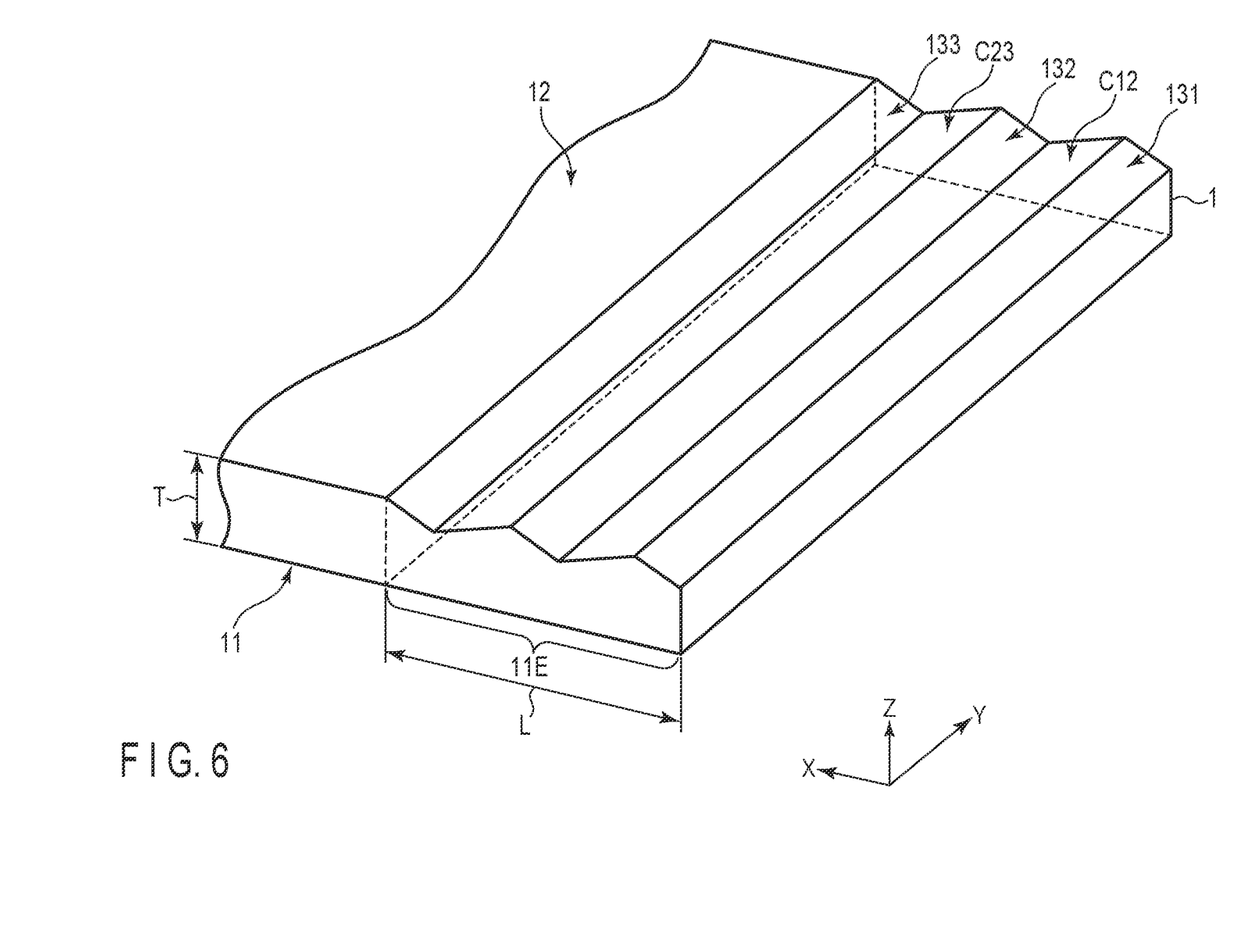
FIG. 6 is a view showing another example of the light guide 1 shown in FIG. 1.

FIG. 6 is a view showing another example of the light guide 1 shown in FIG. 1.

The light guide 1 has the first plane 11, the second plane 12, a first tilted plane 131, a second tilted plane 132, and a third tilted plane 133. The first plane 11 is a plane parallel to the X-Y plane. The second plane 12 is a plane substantially parallel to the first plane 11 or the X-Y plane. The first tilted plane 131, the second tilted plane 132, the third tilted plane 133, and the second plane 12 are opposed to the first plane 11 in the third direction Z.

The first tilted plane 131, the second tilted plane 132, the third tilted plane 133, and the second plane 12 are arranged in this order in the first direction X. The second tilted plane 132 is located between the first tilted plane 131 and the third tilted plane 133, and the third tilted plane 133 is located between the second tilted plane 132 and the second plane 12.

Each of the first tilted plane 131, the second tilted plane 132, and the third tilted plane 133 is tilted to the first plane 11, the second plane 12 or the X-Y plane. The tilt angle of each of the tilted planes is set to satisfy the total reflection condition as described above. For example, the tilt angles of the respective tilted planes are the same and the tilted planes are parallel to each other, but they are not limited to this example. Each of the first tilted plane 131, the second tilted plane 132, and the third tilted plane 133 extends along the second direction Y.

In the example illustrated, each of a connection part C12 connecting the first tilted plane 131 with the second tilted plane 132, and a connection part C23 connecting the second tilted plane 132 with the third tilted plane 133 is a single plane and is tilted to the second plane 12 or the X-Y plane. The shape of the connection parts C12 and C23 is not limited to the example illustrated.

An area located directly below the first tilted plane 131, the second tilted plane 132, and third tilted plane 133, of the first plane 11, corresponds to the incident light area 11E.

The light guide 1 may be formed of glass or resin.

A length L along the first direction X from the first tilted plane 131 to the third tilted plane 133 or a length L of the incident light area 11E along the first direction X is larger than the thickness T of the light guide 1 along the third direction Z (L>T). The thickness T is 1.5 mm or less, for example, 1.0 mm.

The plurality of light emitting devices 2, which are not illustrated in the figures, are located directly below the incident light area 11E and arranged in the second direction Y, similarly to the example shown in FIG. 3.

Figure 7:
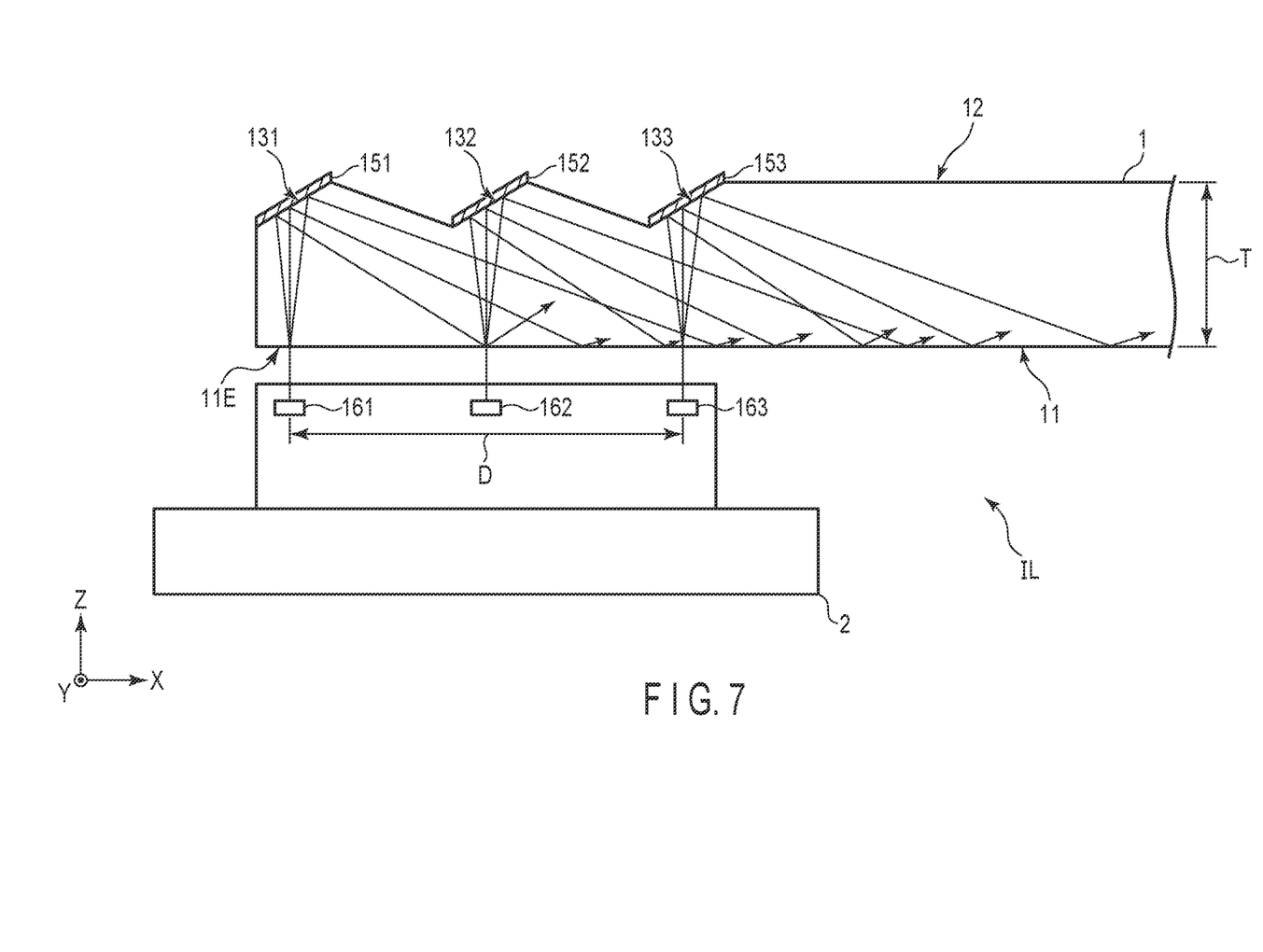
FIG. 7 is a cross-sectional view showing the other example of the illumination device IL.

FIG. 7 is a cross-sectional view showing the other example of the illumination device IL. The only main parts of the light emitting device 2 are illustrated, and illustration of the lens member and the like is omitted.

In each of the light emitting devices 2, the first light emitting part 161, the second light emitting part 162, and the third light emitting part 163 are arranged in this order in the first direction X. The first light emitting part 161 is located directly below the first tilted plane 131, the second light emitting part 162 is located directly below the second tilted plane 132, and the third light emitting part 163 is located directly below the third tilted plane 133. Each of the first light emitting part 161, the second light emitting part 162, and the third light emitting part 163 is configured to emit light toward the incident light area 11E.

The illumination device IL comprises a first reflective layer 151, a second reflective layer 152, and a third reflective layer 153. The first reflective layer 151 is disposed on the first tilted plane 131 and is located directly above the first light emitting part 161. The second reflective layer 152 is disposed on the second tilted plane 132 and is located directly above the second light emitting part 162. The third reflective layer 153 is disposed on the third tilted plane 133 and is located directly above the third light emitting part 163. A single reflective layer may be disposed from the first tilted plane 131 to the third tilted plane 133.

The distance D along the first direction X from the first light emitting part 161 to the third light emitting part 163 is larger than the thickness T of the light guide 1 (D>T).

Each of the red light emitted from the first light emitting part 161, the green light emitted from the second light emitting part 162, and the blue light emitted from the third light emitting part 163 is made incident from the incident light area 11E. The red light is reflected on the first reflective layer 151, the green light is reflected on the second reflective layer 152, and the blue light is reflected on the third reflective layer 153. The reflected light of each color is totally reflected on the first plane 11 to propagate inside the light guide 1.

Figure 8:
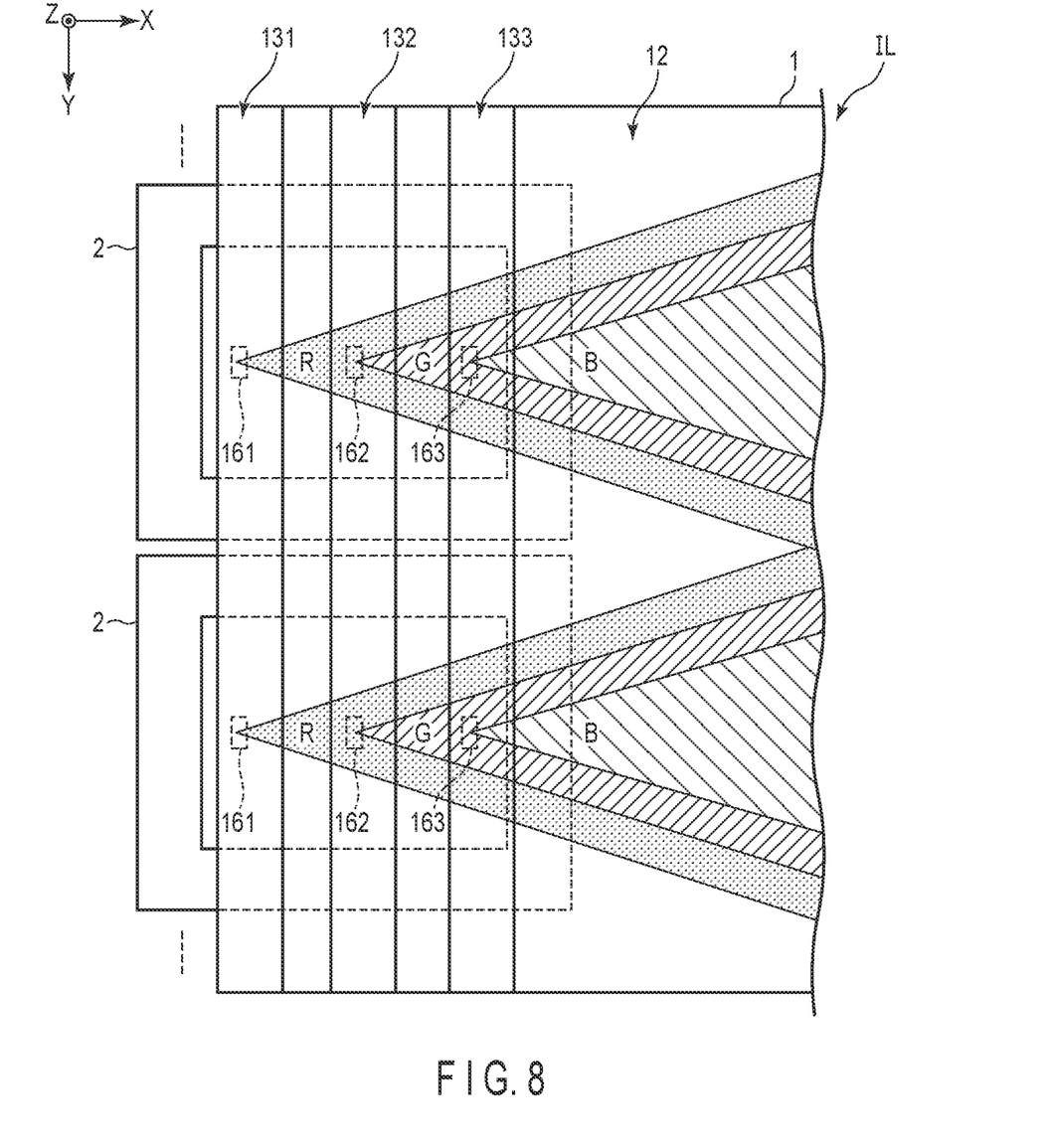
FIG. 8 is a plan view showing the other example of the illumination device IL.

FIG. 8 is a plan view showing the other example of the illumination device IL.

In planar view, the first tilted plane 131 overlaps a plurality of first light emitting parts 161 arranged in the second direction Y. Similarly, the second tilted plane 132 overlaps a plurality of second light emitting parts 162 arranged in the second direction Y, and the third tilted plane 133 overlaps a plurality of third light emitting parts 163 arranged in the second direction Y.

The red light (R) emitted from the first light emitting part 161, the green light (G) emitted from the second light emitting part 162, and the blue light (B) emitted from the third light emitting part 163 mix together while propagating along the first direction X. In addition, in the area overlapping the second plane 12, the light emitted from each of the light emitting devices 2 adjacent in the second direction Y spread in the second direction Y while propagating along the first direction X and mix together.

In this example, too, the same advantages as those described above can be obtained. In addition, similarly to the above example, the position in the third direction Z of each of the first tilted plane 131, the second tilted plane 132, and the third tilted plane 133 is not restricted and the thickness T of the light guide 1 can be made smaller as compared with a case where the light emitting device 2 overlaps the single tilted plane 13.

According to the above-described embodiments, an illumination device capable of being downsized can be provided.

All of the illumination devices that can be implemented by a person of ordinary skill in the art through arbitrary design changes to the illumination devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
   a light emitting device comprising a first light emitting part, a second light emitting part adjacent to the first light emitting part in a first direction, and a third light emitting part adjacent to the second light emitting part in the first direction;
   a light guide comprising a tilted portion opposed to the light emitting device and including a plane tilted to the first direction, and an effective area portion configured to guide light made incident from the tilted portion and to emit light propagating inside the light guide; and
   a liquid crystal panel configured to display images by selectively transmitting light emitted from the effective area portion of the light guide, wherein
   a distance along the first direction from the first light emitting part to the third light emitting part is larger than a thickness of the effective area portion.

2. The display device of claim 1, wherein
the first light emitting part, the second light emitting part, and the third light emitting part are configured to emit respective light of wavelengths different from each other.

3. The display device of claim 1, wherein
the tilted portion has a constant thickness in a second direction crossing the first direction, and
a length of the tilted portion along the first direction is larger than a thickness of the effective area portion along a third direction crossing the first direction and the second direction.

4. The display device of claim 1, wherein
an angle formed between the first direction and the plane of the tilted portion is an acute angle.

* * * * *